United States Patent
Bab-Dinitz et al.

(10) Patent No.: US 10,901,631 B2
(45) Date of Patent: *Jan. 26, 2021

(54) EFFICIENT ADAPTIVE READ-AHEAD IN LOG STRUCTURED STORAGE

(71) Applicant: International Business Machines Corporation, Armonk, NY (US)

(72) Inventors: Avraham Bab-Dinitz, Rehovot (IL); Dorit Hakmon, Tel Aviv (IL); Asaf Porat-Stoler, Tel Aviv (IL); Yosef Shatsky, Karnei Shomron (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/419,758

(22) Filed: May 22, 2019

(65) Prior Publication Data

US 2019/0272112 A1    Sep. 5, 2019

Related U.S. Application Data

(63) Continuation of application No. 15/714,598, filed on Sep. 25, 2017, now Pat. No. 10,303,379.

(51) Int. Cl.
   *G06F 3/06*     (2006.01)
   *G06F 12/0862*  (2016.01)
   *G06F 12/128*   (2016.01)

(52) U.S. Cl.
   CPC ............ *G06F 3/0619* (2013.01); *G06F 3/061* (2013.01); *G06F 3/0659* (2013.01);
   (Continued)

(58) Field of Classification Search
   CPC .................................................. G06F 12/0862
   See application file for complete search history.

(56) References Cited

U.S. PATENT DOCUMENTS 5,465,342 A    11/1995  Walsh
5,809,560 A     9/1998  Schneider
(Continued)

FOREIGN PATENT DOCUMENTS

JP         2008310741 A      12/2008

OTHER PUBLICATIONS

"List of IBM Patents or Patent Applications Treated as Related", May 22, 2019, 2 Pages.
(Continued)

*Primary Examiner* — Edward J Dudek, Jr.
(74) *Attorney, Agent, or Firm* — Stephen R. Tkacs; Stephen J. Walder, Jr.; Robert M. Sullivan

(57) ABSTRACT

A mechanism is provided in a data processing system comprising at least one processor and at least one memory. The at least one memory comprise instructions which are executed by the at least one processor and configure the processor to implement a read-ahead manager for adaptive read-ahead in log structured storage. The read-ahead manager determines a probability value P representing a probability to read into cache a temporal environment for a front-end read for a given segment in user space in a log structured storage. Responsive to performing a front-end read of a record of the given segment in the log structured storage, the read-ahead manager performs pre-fetch of the temporal environment for the record with probability P.

18 Claims, 3 Drawing Sheets

(52) U.S. Cl.
CPC .......... *G06F 3/0665* (2013.01); *G06F 3/0689* (2013.01); *G06F 12/0862* (2013.01); *G06F 12/128* (2013.01)

(56) References Cited

U.S. PATENT DOCUMENTS

| | | |
|---|---|---|
| 6,272,590 B1 | 8/2001 | Riedle |
| 6,643,743 B1 | 11/2003 | Hum et al. |
| 8,230,422 B2 | 7/2012 | Bohrer et al. |
| 9,244,861 B2 | 1/2016 | de la Iglesia |
| 10,303,379 B2* | 5/2019 | Bab-Dinitz ............ G06F 3/0619 |
| 2009/0019229 A1 | 1/2009 | Morrow et al. |
| 2012/0166734 A1* | 6/2012 | Zeidner ............... G06F 12/0862 |
| | | 711/137 |
| 2014/0149678 A1* | 5/2014 | Chaudhary ......... G06F 12/0862 |
| | | 711/137 |
| 2016/0019155 A1* | 1/2016 | Radhakrishnan ... G06F 12/0862 |
| | | 711/137 |
| 2016/0259734 A1 | 9/2016 | Mukherjee et al. |

OTHER PUBLICATIONS

"Method and Apparatus for Dynamic Cache Bypass and Insertion", Disclosed Anonymously, An IP.com Prior Art Database Technical Disclosure, IP.com No. IPCOM000223644D, Nov. 20, 2012, 7 Pages.

"Storing multiple under-utilized cache blocks in one physical cache line", IBM Corporation, An IP.com Prior Art Database Technical Disclosure, IP.com No. IPCOM000143550D, Nov. 28, 2006, 6 Pages.

\* cited by examiner

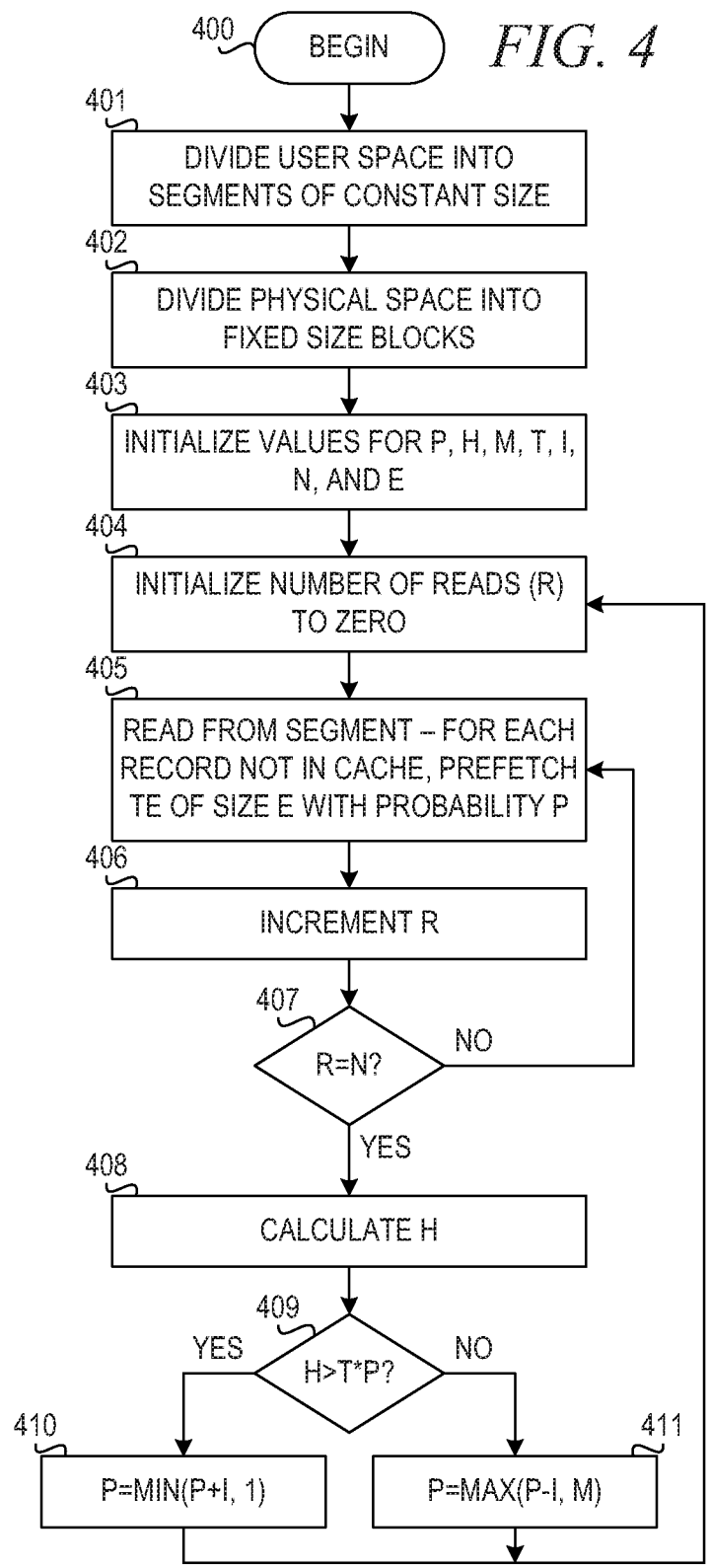

EFFICIENT ADAPTIVE READ-AHEAD IN LOG STRUCTURED STORAGE

BACKGROUND

The present application relates generally to an improved data processing apparatus and method and more specifically to mechanisms for efficient adaptive read-ahead in log structured storage.

A log structured storage system (LSSS) or log structured file system (LFS) is a form of disk storage management to improve disk access time. Log structured storage systems (LSSSs) use the assumption that files are cached in a main memory and that increasing memory sizes will make the caches more effective at responding to read requests. As a result, disk use is dominated by writes. An LSSS writes all new information to disk in a sequential structure called a log. New information is stored at the end of the log rather than updated in place, to reduce disk seek activity. As information is updated, portions of data records at intermediate locations of the log become outdated. This approach increases write performance by eliminating almost all seeks. The sequential nature of the log also permits faster crash recovery.

In an LSSS, data is stored permanently in the log and there is no other structure on disk. For an LSSS to operate efficiently, it must ensure that there are always large extents of free space available for writing new data.

Log structured disks (LSD) and log structured arrays (LSA) are disk architectures that use the same approach as the LSSS. LSAs combine the LSSS architecture and disk array architecture with a parity technique to improve reliability and availability. Generally, an LSA includes an array of physical discs and a program that manages information storage to write updated data into new disk locations rather than writing new data in place. Therefore, the LSA keeps a directory which it uses to locate data items in the array.

As an illustration of the N+1 physical disks of the LSA array, an LSA system may include a group of direct access storage devices (DASDs), each of which includes multiple disk platters stacked into a column. Each disk is divided into large consecutive areas called segment-columns. A segment-column is typically as large as a physical cylinder on a physical disk. Corresponding segment-columns from the N+1 disks constitute a segment. The array has as many segments as there are segment-columns on a disk in the array.

A logical track is stored entirely within some segment-column of some physical disk of the array; many logical tracks can be stored in the same segment-column. The location of a logical track in an LSA changes over time. A directory, called the LSA directory, indicates the current location of each logical track. The size of a logical track is such that many logical tracks can be stored in the same LSA segment-column.

In LSAs and LSSSs, data to be written is grouped together into relatively large blocks which are written out as a unit in a convenient free block location on disk. When data is written, the previous disk locations of the data become free creating unused data (or garbage) in the blocks on disk. Eventually the disk fills up with blocks and it may be necessary to create free block locations by reading source blocks containing at least some unused data and compacting their still-in-use content into a lesser number of destination blocks without any unused data. This process is called free space (or garbage) collection.

To ensure that there is always an empty block to write to, all logical tracks from a block selected for free space collection that are still in that block (i.e., are still pointed to by the LSA directory) are typically read from disk and placed in a memory block. These logical tracks will be written back to disk when the memory block fills. Free space collected blocks are returned to the empty block pool and are available when needed.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided in a data processing system comprising at least one processor and at least one memory, the at least one memory comprising instructions which are executed by the at least one processor and configure the processor to implement a read-ahead manager for adaptive read-ahead in log structured storage. The read-ahead manager determines a probability value P representing a probability to read into cache a temporal environment for a front-end read for a given segment in user space in a log structured storage. Responsive to performing a front-end read of a record of the given segment in the log structured storage, the read-ahead manager performs pre-fetch of the temporal environment for the record with probability P.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 4 is a flowchart illustrating operation of a read cache read-ahead manager for adaptive read-ahead in log structured storage in accordance with an illustrative embodiment.

DETAILED DESCRIPTION

Figure 1:
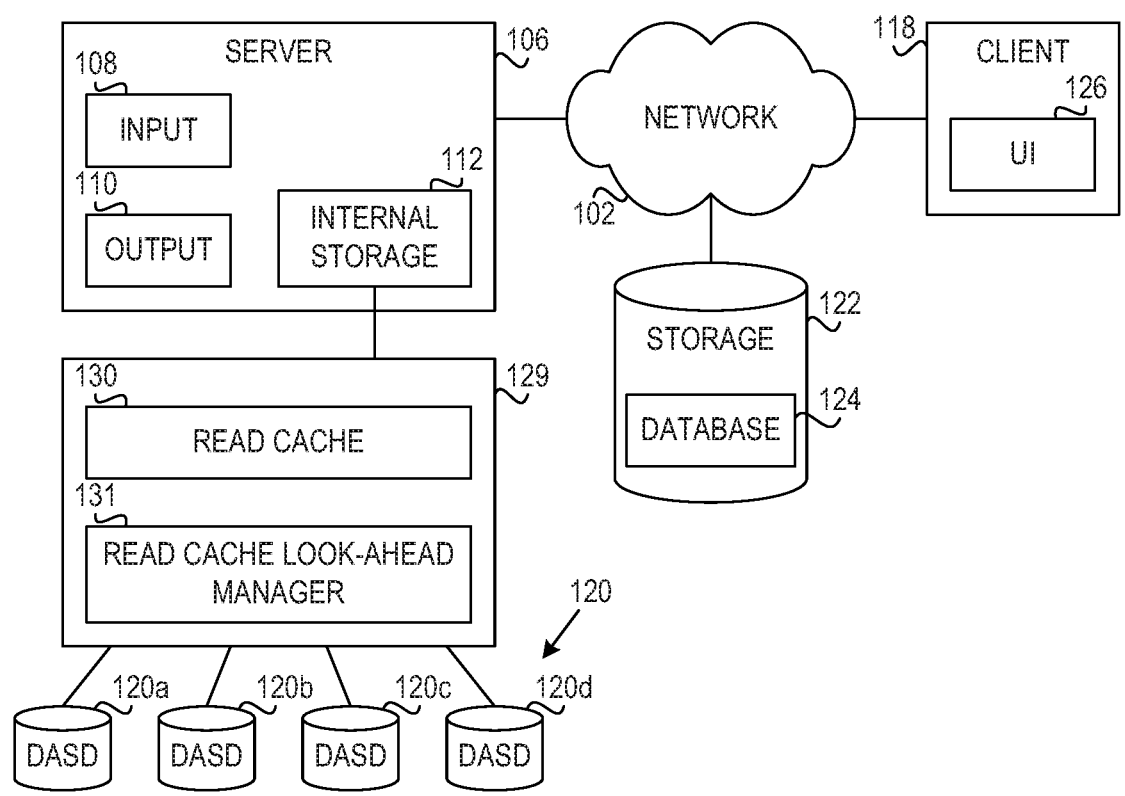
FIG. 1 is a block diagram illustrating an example computer environment in which aspects of the illustrative embodiments may be implemented.

To efficiently pre-load storage data to cache memory, one should predict near-future read requests. This can be done by identifying read patterns. Two very common read patterns are (i) sequential reads in the user space and (ii) reading pieces of data in the order in which they were written. The latter pattern is known as "temporal locality" (TL). Log structured storage systems store sequentially in storage space user-writes that are sequential in time and can, thus, "piggy-back" read-ahead input/output operations (IOs) on IOs issued to serve specific front-end reads.

Because read patterns in a storage system are dynamic and change over space and time, efficient prediction must be adaptive. The illustrative embodiments provide a mechanism for predicting and utilizing TL patterns for cache read-ahead. The illustrative embodiments automatically and efficiently identify TL trends (i.e., when and where in storage space a TL pattern starts and when it ends) and efficiently utilizes these trends for cache read-ahead. A temporal environment (TIE) consists of the data records that were written in time proximity to a given record. In an LSSS, reading a data record from storage and caching the TE for that record can be performed in a single read operation from the storage space. This is very cost-effective when TL read patterns are encountered but wasteful otherwise.

Each record fetched from storage to serve a specific front-end read is populated into the cache. The mechanism of the illustrative embodiment continuously performs TE caching on some random portion of records. Increase in cache-hit frequency implies increase in TL read patterns in which case the mechanism of the illustrative embodiment increases the portion of TE caching. Decrease in cache-hit frequency implies decrease in TL read patterns in which case the mechanism decreases the portion of TE caching. The portion is never decreased below some positive minimum sample rate.

In the illustrative embodiments, TE caching serves two roles:

1. A survey that examines the current value of TE caching for read-ahead. Cache-hit frequency is the feedback for that survey.

2. Effective read-ahead.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
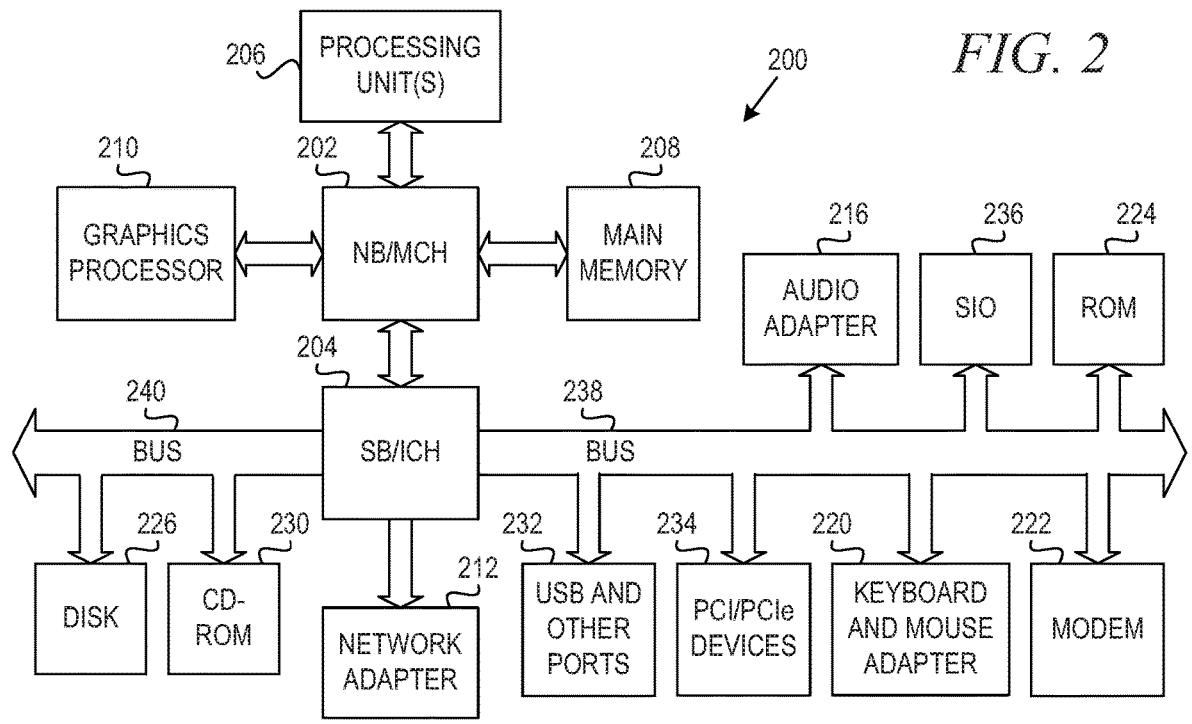
FIG. 2 is a block diagram of just one example data processing system in which aspects of the illustrative embodiments may be implemented.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 is a block diagram illustrating an example computer environment in which aspects of the illustrative embodiments may be implemented. FIG. 1 is an illustration of one implementation and is not intended to imply any limitation with regard to the environments in which different embodiments may be implemented. Many modifications to the depicted environments may be made.

In one embodiment network 102 can be the Internet which uses the TCP/IP suite of protocols. Network 102 may also comprise a number of different types of networks, such as an intranet, a local area network (LAN), a wide area network (WAN), wireless local area network (WLAN), synchronous optical network (SONET), and the like.

Network 102 provides communication links between various devices and computers. Network 102 may include connections, such as wire, wireless communication links, fiber optic cables, or any other connection technology known in the art. Network 102 may include additional server computers, client computers, displays and other devices not shown.

The exemplary computer environment 100 comprises server computer 106 coupled to client computer 118 and storage unit 122 via network 102. Server computer 106 connects to network 102. Server computer 106 may be a workstation, a mainframe computer, a personal computer, and the like. Server computer 106 is configured to communicate with an external storage system 120. In an embodiment, storage system 120 may include N+1 direct access storage devices (DASD) in which information is maintained as a log structured array (LSA). In FIG. 1, an array 120 including four DASDs 120a, 120b, 120c, 120d is shown for illustration, but it should be understood that the DASD array may include a greater or lesser number of DASD. A control unit program 129 controls the storage of information so that the DASD array 120 is maintained as an LSA. Thus, the DASD recording area is divided into multiple segment-column areas and all like segment-columns from all the DASDs collectively include one segment's worth of data. The control unit program 129 manages the transfer of data to and from the DASD array 120 so that periodically it considers segments for free space and selects target segments according to a collection score described in detail below.

In an embodiment, control unit program 129 may comprise program instructions stored on one or more computer-readable tangible storage devices, which may include internal storage 112 on server computer 106. Control unit program 129 may communicate via local and/or remote processes, such as in accordance with a signal having one or more data packet (for example, but not limited to, data from one program interacting with another program in a local system, distributed system, and/or across network 102 with other systems via the signal). Data gathered, generated, and maintained for use by control unit program 129 may be kept in internal storage 112 of server computer 106 or in one or more databases 124 of storage unit 122.

In an embodiment, control unit program 129 may include various programs or program components, such as read cache 130 and look-ahead manager 131. Read cache look-ahead manager 131 may be, for example, a computer program or program component for performing adaptive look ahead for log structured storage. Read cache look-ahead manager 131 may reside within control unit program 129 and may be localized on server 106 and/or distributed between two or more servers. In accordance with the illustrative embodiments, read cache look-ahead manager 131 performs adaptive look-ahead pre-fetch into read cache 130 to increase or decrease temporal environment (TE) caching as cache-hit frequency increases or decreases, respectively.

Operation of read cache look-ahead manager is described in further detail below with reference to FIG. 4.

Client computer 118 also connects to network 102. Client computer 118 may be, for example, a mobile device, telephone, television receiver, cell phone, personal digital assistant, netbook, laptop computer, tablet computer, desktop computer, and/or any type of computing devices capable of executing software in accordance with the embodiments described herein. Client computer 118 may contain user interface (UI) 126. UI 126 can be, for example, graphical user interface (GUI) or web user interfaces (WUI). Client computer 118 may receive, process, display and/or otherwise render data contained within external storage system 120.

As noted above, the mechanisms of the illustrative embodiments utilize specifically configured computing devices, or data processing systems, to perform the operations for adaptive read-ahead. These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System P® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to the mechanism for adaptive read-ahead in log structured storage.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
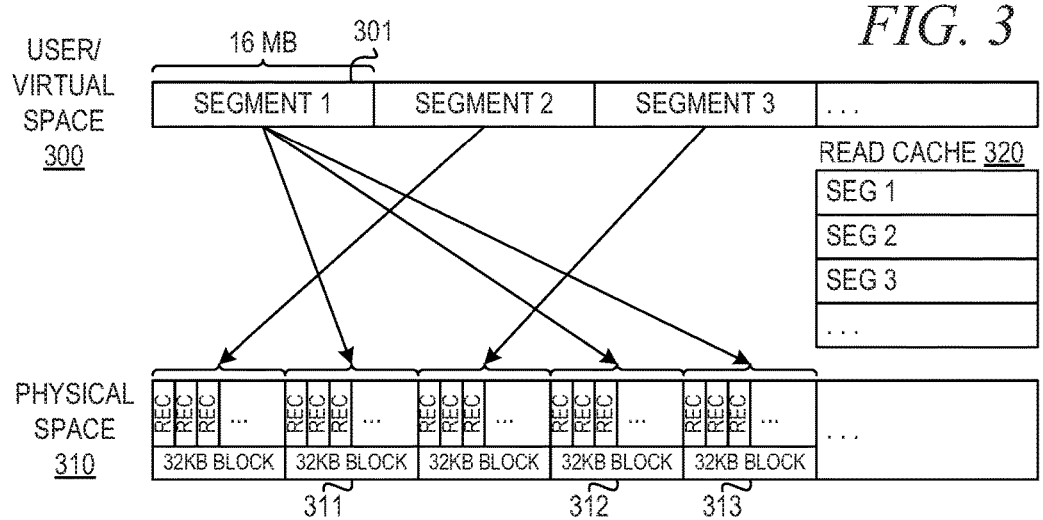
FIG. 3 is a block diagram illustrating user space and physical space in log structured storage in accordance with an illustrative embodiment.

FIG. 3 is a block diagram illustrating user space and physical space in log structured storage in accordance with an illustrative embodiment. To account for patterns that are local to small areas of user space 300, the space is divided into segments of a consistent size. In the example implementation depicted in FIG. 3, the user space 300 is divided into 16 MB segments. The physical space 310 is also divided into fixed size blocks. In the depicted example, the implementation uses 32 KB blocks. At a given time, a physical block serves a single user space segment; however, a user space segment references a plurality of physical space blocks.

As shown in the example of FIG. 3, segment 1 301 in the user or virtual space 300 is stored as records in a plurality of blocks 311-313 in the physical space 310. Sequences of records are stored in read cache 320, and reads may be performed from read cache 320.

For each user-space segment, the read-ahead manager of the illustrative embodiment maintains the following:

P—the probability to read into cache the temporal environment (TE) of a record required by a front-end read. $M<=P<=1$. M is a constant.

H—the portion of front-end read records that resulted in a cache hit. $0<=H<=1$.

The read-ahead manager uses the following configuration parameters to tune the system:

M—the minimum pre-fetch ratio. $0<=M<1$.

T—a cache hit threshold. $0<T<1$.

I—increment step. $0<I<1$.

N—increment interval. N is a positive integer.

E—the size of the TE of a log that is pre-fetched.

d—a small preconfigured delta.

Following every N reads from a segment, if $H>T\times P+d$, then the read-ahead manager sets $P=\min(P+I, 1)$; else, if $H<T\times P+d$, then the read-ahead manager sets $P=\max(P-I, M)$. For a log that is read from storage to serve a read request, the read-ahead manager pre-fetches the TE of size E with a probability P.

As an example optimized configuration, the read-ahead manager sets $M=0.1$, $T=0.85$, $I=0.3$, $N=30$, and $E=32$ KB.

In a read cache initial configuration, segment 1 has probability $P=0.5$. For every physical record read for segment 1, the read-ahead manager randomly fetches the entire block with probability 0.5. That is, the read-ahead manager fetches the entire block half the time in this example.

Assume the front-end reads N (thirty) records from segment 1, twenty-one of them were a cache hit and nine were a cache miss. The read-ahead manager determines the following:

$H=0.7$ $T\times P=0.85\times0.5=0.425$ $H>T*P \rightarrow P:=P+I=0.8$

Then, reading cache from segment 1, $P=0.8$. Thus, for every physical record read for segment 1, the read-ahead manager fetches the entire block with probability 0.8.

Assume in the next N read records from segment 1, there were again twenty-one cache hits. The read-ahead manager determines the following:

$H=0.7$ $T\times P=0.85\times0.8=0.68$ $H\approx T\times P \rightarrow P:=P=0.8$ If after sixty records read from cache from segment 1 the cache hit rate is stable, then the read-ahead probability will also stabilize.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

FIG. 4 is a flowchart illustrating operation of a read cache read-ahead manager for adaptive read-ahead in log structured storage in accordance with an illustrative embodiment. Operation begins (block 400), and the read-ahead manager divides user space into segments of a constant size (block 401) and divides physical space into fixed size blocks (block 402). The read-ahead manager initializes values (block 403). For a given user-space segment, the read-ahead manager maintains the following:

P—the probability to read into cache the temporal environment (TE) of a record required by a front-end read. $M<=P<=1$. M is a constant.

H—the portion of front-end read records that resulted in a cache hit. $0<=H<=1$.

The read-ahead manager also uses the following configuration parameters to tune the system:

M—the minimum pre-fetch ratio. $0<=M<1$.

T—a cache hit threshold. $0<T<1$.

I—increment step. $0<I<1$.

N—increment interval. N is a positive integer.

E—the size of the TE of a log that is pre-fetched.

The read-ahead manager initializes a number of reads (R) to zero (block 404) and reads from the given segment (block 405). For each record that is read from storage (i.e., is not in cache), the read-ahead manager prefetches TE of size E with probability P. Then, the read-ahead manager increments R (block 406). The read-ahead manager determines whether R equals N (block 407). If R does not equal N, then operation returns to block 405 to perform the next read from the given segment.

If R equals N in block 407, then the read-ahead manager calculates the cache hit ratio H (block 408). The read-ahead manager determines whether the cache hit ratio H is greater than T×P (block 409). If H>T×P, then the read-ahead manager calculates the probability P as follows: P=min(P+I, 1) (block 410). If H<=T×P in block 409, then the read-ahead manager calculates the probability P as follows: P=max(P−I, M) (block 411). Thereafter, operation returns to block 404 to initialize the number of reads R to zero.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory, the at least one memory comprising instructions which are executed by the at least one processor and configure the processor to implement a read-ahead manager for adaptive read-ahead in log structured storage, the method comprising:
   determining, by the read-ahead manager, a probability value P representing a probability to read into a read cache a temporal environment for a front-end read for a given segment in user space in a log structured storage;
   for front-end reads of records of the given segment in the log structured storage, randomly performing, by the read-ahead manager, pre-fetch of the temporal environment for the given segment into the read cache with probability P such that for a given number of front-end reads of the given segment the percentage of pre-fetches versus front-end reads without a pre-fetch is P;
   responsive to reading a predetermined number of front-end reads of records for the given segment, determining, by the read-ahead manager, a cache hit ratio associated with the given segment;
   responsive to determining the cache hit ratio is increasing for the given segment, increasing, by the read-ahead manager, the probability value P; and
   responsive to determining the cache hit ratio is decreasing for the given segment, decreasing, by the read-ahead manager, the probability value P.

2. The method of claim 1, wherein increasing the probability value P comprises calculating the probability value as follows:

$$P=\min(P+I,1),$$

wherein I is a predetermined increment step and wherein $0<I<1$.

3. The method of claim 1, wherein decreasing the probability value P comprises calculating the probability value as follows:

$$P=\max(P-1,M),$$

wherein I is a predetermined increment step, wherein 0<I<1, wherein M is a predetermined pre-fetch ratio, and wherein 0<=M<1.

4. The method of claim 1, wherein the temporal environment is of a predetermined size.

5. The method of claim 1, wherein determining that the cache hit ratio is increasing for the given segment comprises determining that H >T×P+d, wherein H is the cache hit ratio, T is a predetermined cache hit threshold, and d is a preconfigured delta.

6. The method of claim 1, wherein determining that the cache hit ratio is decreasing for the given segment comprises determining that H<T×P+d, wherein H is the cache hit ratio, T is a predetermined cache hit threshold, and d is a preconfigured delta.

7. A computer program product comprising a computer readable storage medium having a computer readable program stored therein, wherein the computer readable program, when executed on a computing device, causes the computing device to implement a read-ahead manager for adaptive read-ahead in log structured storage, wherein the computer readable program causes the computing system to:
determine, by the read-ahead manager, a probability value P representing a probability to read into a read cache a temporal environment for a front-end read for a given segment in user space in a log structured storage;
for front-end reads of records of the given segment in the log structured storage, randomly perform, by the read-ahead manager, pre-fetch of the temporal environment for the given segment into the read cache with probability P such that for a given number of front-end reads of the given segment the percentage of pre-fetches versus front-end reads without a pre-fetch is P;
responsive to reading a predetermined number of front-end reads of records for the given segment, determine, by the read-ahead manager, a cache hit ratio associated with the given segment;
responsive to determining the cache hit ratio is increasing for the given segment, increase, by the read-ahead manager, the probability value P; and
responsive to determining the cache hit ratio is decreasing for the given segment, decrease, by the read-ahead manager, the probability value P.

8. The computer program product of claim 7, wherein increasing the probability value P comprises calculating the probability value as follows:

$P=\min(P+I,1)$, wherein I is a predetermined increment step and wherein 0<I<1.

9. The computer program product of claim 7, wherein decreasing the probability value P comprises calculating the probability value as follows:

$P=\max(P-I,M)$, wherein I is a predetermined increment step, wherein 0<I<1, wherein M is a predetermined pre-fetch ratio, and wherein 0<=M<1.

10. The computer program product of claim 7, wherein the temporal environment is of a predetermined size.

11. The computer program product of claim 7, wherein determining that the cache hit ratio is increasing for the given segment comprises determining that H >T×P+d, wherein H is the cache hit ratio, T is a predetermined cache hit threshold, and d is a preconfigured delta.

12. The computer program product of claim 7, wherein determining that the cache hit ratio is decreasing for the given segment comprises determining that H<T×P+d, wherein H is the cache hit ratio, T is a predetermined cache hit threshold, and d is a preconfigured delta.

13. An apparatus comprising:
at least one processor; and
at least one memory coupled to the at least one processor, wherein the at least one memory comprises instructions which, when executed by the at least one processor, cause the at least one processor to implement a read-ahead manager for adaptive read-ahead in log structured storage, wherein the instructions cause the at least one processor to:
determine, by the read-ahead manager, a probability value P representing a probability to read into a read cache a temporal environment for a front-end read for a given segment in user space in a log structured storage;
for front-end reads of records of the given segment in the log structured storage, randomly perform, by the read-ahead manager, pre-fetch of the temporal environment for the given segment into the read cache with probability P such that for a given number of front-end reads of the given segment the percentage of pre-fetches versus front-end reads without a pre-fetch is P;
responsive to reading a predetermined number of front-end reads of records for the given segment, determine, by the read-ahead manager, a cache hit ratio associated with the given segment;
responsive to determining the cache hit ratio is increasing for the given segment, increase, by the read-ahead manager, the probability value P; and
responsive to determining the cache hit ratio is decreasing for the given segment, decrease, by the read-ahead manager, the probability value P.

14. The apparatus of claim 13, wherein increasing the probability value P comprises calculating the probability value as follows:

$P=\min(P+I,1)$, wherein I is a predetermined increment step and wherein 0<I<1.

15. The apparatus of claim 13, wherein decreasing the probability value P comprises calculating the probability value as follows:

$P=\max(P-1,M)$, wherein I is a predetermined increment step, wherein 0<I<1, wherein M is a predetermined pre-fetch ratio, and wherein 0<=M<1.

16. The apparatus of claim 13, wherein the temporal environment is of a predetermined size.

17. The apparatus of claim 13, wherein determining that the cache hit ratio is increasing for the given segment comprises determining that H >T×P+d, wherein H is the cache hit ratio, T is a predetermined cache hit threshold, and d is a preconfigured delta.

18. The apparatus of claim 13, wherein determining that the cache hit ratio is decreasing for the given segment comprises determining that H<T×P+d, wherein H is the cache hit ratio, T is a predetermined cache hit threshold, and d is a preconfigured delta.

* * * * *